United States Patent [19]

Bauer

[11] 4,171,526
[45] Oct. 16, 1979

[54] EVENT MARK DECODER FOR USE WITH TIME CODE GENERATOR

[75] Inventor: Peter W. Bauer, San Diego, Calif.

[73] Assignee: The United States of America as represented by the Secretary of the Navy, Washington, D.C.

[21] Appl. No.: 947,982

[22] Filed: Oct. 2, 1978

[51] Int. Cl.² ............................................. G01D 9/00
[52] U.S. Cl. ..................................... 346/23; 307/203; 307/265; 328/187; 346/114
[58] Field of Search ................ 346/23, 20, 115–117; 307/203, 205, 215, DIG. 5, 265; 328/104, 111, 119, 187, 14; 340/353, 345

[56] References Cited

U.S. PATENT DOCUMENTS

| | | | |
|---|---|---|---|
| 3,409,895 | 11/1968 | Hayden | 346/23 X |
| 3,611,404 | 10/1971 | Doggett | 346/23 X |
| 3,749,868 | 7/1973 | Lutz | 346/23 |

Primary Examiner—Joseph W. Hartary
Attorney, Agent, or Firm—R. S. Sciascia; G. J. Rubens; T. M. Phillips

[57] ABSTRACT

A logic circuit for decoding parallel BCD output from a time code generator to operate an analog event marker pen on a strip chart recorder, every one minute a one second pulse, every ten minutes a ten second pulse, and every hour a sixty-one second pulse output is generated.

8 Claims, 2 Drawing Figures

EVENT MARK DECODER FOR USE WITH TIME CODE GENERATOR

BACKGROUND OF THE INVENTION

In general, strip chart recorders utilize a strip chart having a sequence of timing grid lines. A problem of such an arrangement is that, although the spacing between successive timing grid lines is precisely determined regardless of the chart speed, there is no way to identify the time interval between adjacent grid lines in the absence of the operator making some notation on the chart as to the time interval of chart timing grid lines. In addition, it is relatively difficult to ascertain from the recording the elapse time between two recorded events since each of the grid lines would have to be counted to arrive at a summation of the elapse time between the recorded events.

Therefore, it is desirable to provide means for coded timing grid lines on the recording charts such that the time interval between successive grid lines is readily ascertained from the chart. In addition, it is desirable to provide means for printing coded time marks corresponding to various increasing intervals of time to facilitate counting of a time interval between two widely spaced events on the recording.

SUMMARY OF THE INVENTION

The present invention provides a means for the decoding of a time code generator/translator to operate an event marker pen. The decoder means consist of a logic system adapted to receive binary coded decimal (BCD) signals to generate pulses at one second, ten second, one minute, and ten minute intervals. The various time interval pulses are logically combined in such a manner as to provide a one second pulse every minute, a ten second pulse even ten minutes, and a sixty-one second pulse every hour. This then provides a person interpreting the recording made on the strip chart with precise timing information so that regardless of chart speed accuracy, a valid interpretation of the information recorded on the chart can be made.

OBJECTS OF THE INVENTION

Accordingly, an object of the invention is to provide a simple means of decoding parallel binary coded decimal, digital signals to generate precision time marks on an analog strip chart recorder.

Another object of the invention is the provision of a means of decoding parallel binary coded decimal output from a standard IRIG B time code generator to provide every one minute a one second pulse, every ten minutes a ten second pulse, and every hour a sixty-one second pulse output for operating an analog event marker pen on a strip chart recorder.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
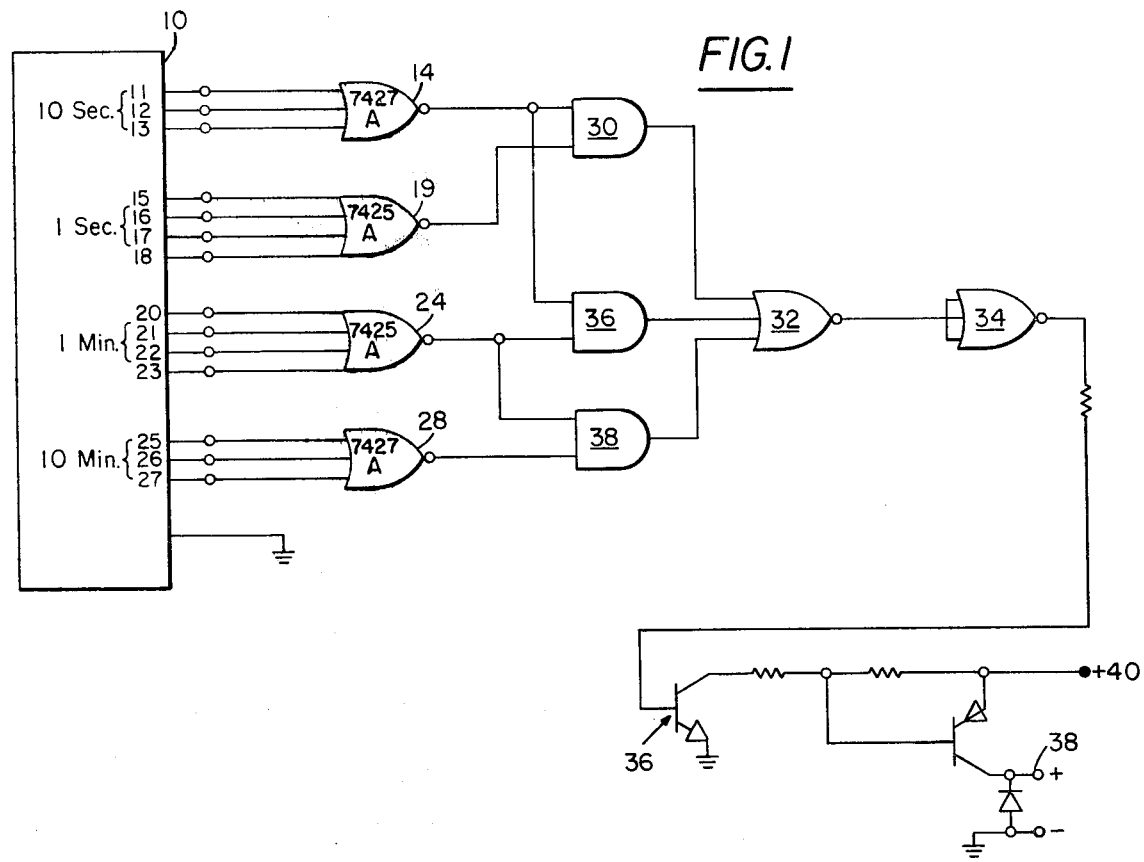
FIG. 1 is a schematic diagram of a preferred embodiment of the invention.

Referring now to the drawings wherein there is shown in FIG. 1 a time code generator 10 with binary coded digital outputs. Outputs 11, 12, and 13 are parallel binary coded decimal signals that continually count at ten second intervals to six and then resets to zero. Then every one minute when the outputs resets to zero a ten second output pulse will appear at the output of NOR gate 14. The outputs 15, 16, and 17 count at one second intervals to ten and reset to zero. When the output resets to zero, a one second output pulse will appear at the output of NOR gate 19. The outputs 20, 21, 22, and 23 count at one minute intervals to ten and reset to zero. When the output resets to zero, a one minute pulse appears at the output of NOR gate 24. The outputs 25, 26, and 27 of the time code generator 10 counts to six every hour and resets to zero. When reset to zero, a ten minute output pulse appears at the output of NOR gate 28.

The outputs of NOR gates 14 and 19 are anded in AND gate 30 which outputs a one second pulse once every minute to NOR gate 32. This causes the output of NOR gate to go low which in turn causes NOR gate 34 to go high and provide a one second pulse out.

The outputs from NOR gates 14 and 24 are anded in AND gate 36 which outputs a ten second pulse every ten minutes. This causes the output of NOR gate 32 to go low and in turn causes NOR gate 34 to provide an output pulse of a ten second duration.

The sixty second pulse every hour is obtained by anding the output of NOR gates 24 and 28 in AND gate 38. The one minute pulse is fed to NOR gate 32 and causes NOR gate 32 to go low which in turn causes NOR gate 34 to go high and provide a one minute output pulse. The output pulse from NOR gate 34 is fed to an actuating circuit consisting of a 40 V input that is controlled by transistor switch 36. The actuating coil for the event marker would be connected to terminal 38.

The time code generator 10 which will provide the desired binary coded data outputs is a DATUM model 9300 A time code generator/translator or any IRIG B time code generator with parallel BCD output. All outputs of the code generator 10 are syncronized to reset to zero.

Figure 2:
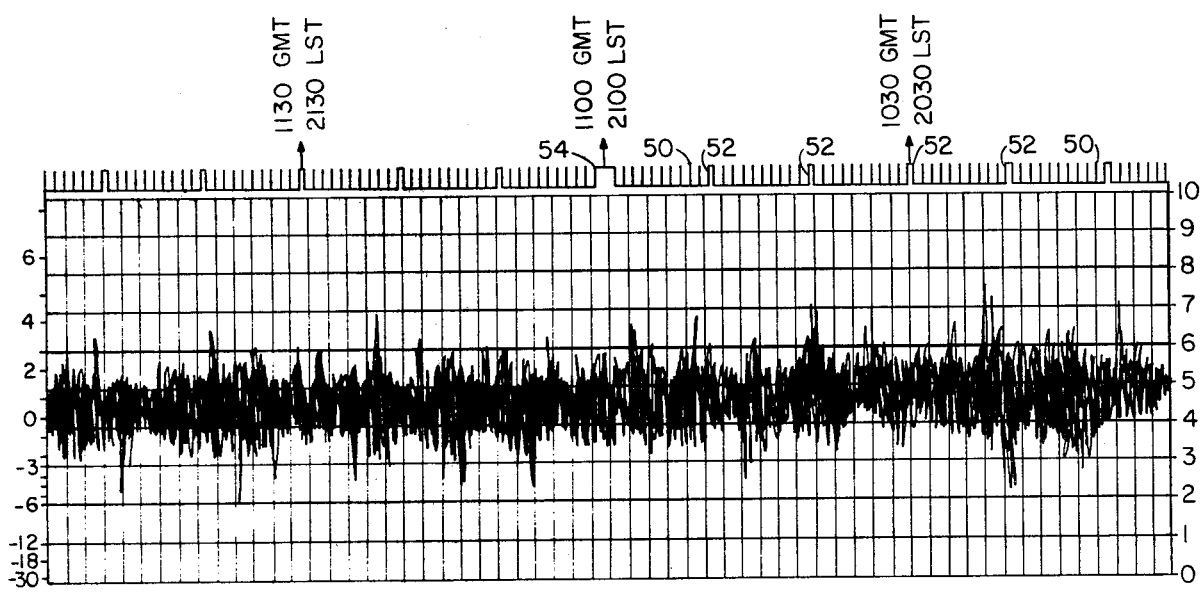
FIG. 2 shows a portion of a strip chart with the timed markings according to the invention.

Referring now to FIG. 2 there is shown a signal 48 that has been recorded. The one second pulses every minute are shown by reference number 50. The ten second pulse every ten minutes is shown as reference number 52 and the sixty second pulse every hour is shown as 54. As can be seen, accurate elasped time is indicated on the edge of the chart making it possible to make an accurate analysis of the information recorded in the tape. The time is accurate on the leading edge of the mark in the direction of paper travel.

Obviously, many other modifications and variations of the present invention are possible in the light of the above teachings. It is therefore to be understood that within the scope of the appended claims the invention may be practiced otherwise than as specifically described.

What is claimed is:

1. An event mark decoder for use with a time code generator the combination comprising:
    first decoding means coupled to said time code generator for providing an output pulse of a first predetermined duration after a first periodically occurring time interval, second decoding means coupled to said time code generator for providing an output pulse of a second predetermined duration after a second periodically occurring time interval, third decoding means coupled to said time code generator for providing an output pulse of a third predetermined duration after a third periodically occurring time interval, fourth decoder means coupled to said time code generator for providing an output pulse of a fourth predetermined duration after a fourth periodically occurring time interval, logic circuit means coupled to said first, second, third, and fourth decoder means for providing an output pulse of said first predetermined duration every said second predetermined time interval, an output pulse of said second predetermined duration every said third predetermined time interval and an output pulse of a fifth predetermined duration every said fourth predetermined time interval.

2. The decoder of claim 1 wherein the outputs of said time code generator are parallel binary coded decimal.

3. The decoder of claim 2 wherein said decoding means is a NOR logic gate.

4. The decoder of claim 3 wherein said logic circuit means includes a first AND gate having a first input connected to the output of said first decoder means and a second input connected to the output of said second decoder means, a second AND gate having a first input connected to the output of said first decoder means and a second input connected to the output of said third decoder means and a third AND gate having a first input connected to the output of said third decoder means and a second input connected to said fourth decoder means.

5. An event mark decoder for use with a time code generator the combination comprising:

first decoding means coupled to said time code generator for providing a one second output pulse every ten seconds;

second decoding means coupled to said time code generator for providing a ten second output pulse once every minute;

third decoding means coupled to said time code generator for providing a one minute output pulse every ten minutes;

fourth decoder means coupled to said time code generator for providing a ten minute output pulse every hour; and logic circuit means coupled to said first, second, third, and fourth decoder means for providing a one second pulse output every minute, a ten second pulse output every ten minutes and a sixty-one second pulse output every hour.

6. The decoder of claim 5 wherein the outputs of said time code generator are parallel binary coded decimal.

7. The decoder of claim 6 wherein said decoding means is a NOR logic gate.

8. The decoder of claim 7 wherein said logic circuit means includes a first AND gate having a first input connected to the output of said first decoder means and a second input connected to the output of said second decoder means, a second AND gate having a first input connected to the output of said first decoder means and a second input connected to the output of said third decoder means and a third AND gate having a first input connected to the output of said third decoder means and a second input connected to said fourth decoder means.

* * * * *